United States Patent [19]

Romano et al.

[11] Patent Number: 4,521,577

[45] Date of Patent: Jun. 4, 1985

[54] LIQUID POLYMERIZABLE COMPOSITIONS OF A CARBONATE OLIGOMER, AN ALLYLCARBONATE AND VINYL ACETATE

[75] Inventors: Ugo Romano, Vimercate; Fiorenzo Renzi, Gorgonzola; Franco Rivetti, Schio; Claudio Gagliardi, S.Donato Milanese, all of Italy

[73] Assignee: Enichimica S.p.A., Milan, Italy

[21] Appl. No.: 568,726

[22] Filed: Jan. 6, 1984

[30] Foreign Application Priority Data

Jan. 13, 1983 [IT] Italy ............... 19085 A/83

[51] Int. Cl.³ .................................. C08F 218/00
[52] U.S. Cl. .................................. 526/261; 350/409; 526/314
[58] Field of Search ............ 526/261, 292.95, 296, 526/313, 314

[56] References Cited

U.S. PATENT DOCUMENTS

| | | | |
|---|---|---|---|
| 4,138,538 | 2/1979 | Kaetsu | 526/320 |
| 4,368,310 | 1/1983 | Leatherman | 526/314 |
| 4,369,298 | 1/1983 | Kida | 526/313 |
| 4,398,008 | 8/1983 | Misura | 526/314 |

FOREIGN PATENT DOCUMENTS 61411 5/1981 Japan ................ 526/314

*Primary Examiner*—Christopher A. Henderson
*Attorney, Agent, or Firm*—Hedman, Gibson, Costigan & Hoare

[57] ABSTRACT

A polymerizable liquid composition is disclosed, intended for preparing polymerizates having outstanding optical and physical properties, said composition consisting of a bis (allylcarbonate) of a dihydric alcohol oligomer, a bis (allylcarbonate) monomer of a dihydric or a trihydric alcohol, or an allyl ester, or a triallyl cyanurate or isocyanurate, and an acrylic or vinylic monomer, said composition being polymerized in bulk with the aid of at least one radicalic initiator. Highly transparent articles are obtained, which are very useful for fine optical applications.

7 Claims, No Drawings

LIQUID POLYMERIZABLE COMPOSITIONS OF A CARBONATE OLIGOMER, AN ALLYLCARBONATE AND VINYL ACETATE

This invention relates to a liquid composition which is capable of being polymerized in bulk, to give cross-linked and transparent polymers, endowed with outstanding properties both optical and mechanical. The invention also relates to the polymers as obtained with such a composition and the relevant articles, such as sheets, lenses and others.

In the field of synthetic polymers for optical uses, the bis(allylcarbonate) of diethylene glycol exhibits a prominent commercial importance in view of the number of the optical and mechanical properties of the respective polymerizate, which is thus utilized in the manufacture of sheets and eyeglass lenses and safety goggles.

In this connection, reference is invited to the following literature: F. Strain, "Encyclopedia of Chemical Processing and Design", 1st Edition, Dekker Inc., New York, Vol. II, pages 452 and seqq., "Encyclopedia of Polymer Science and Technology", Vol. I, pages 799 and seqq; Interscience Publishers, New York 1964. However, the use of such polymerizates suffers from certain limitations. Thus, for example, in the field of lenses having a high corrective power and of lenses exhibiting sharp curvature variations, the polymerizates of the bis(allylcarbonate) of diethylene glycol are seldom employed because of the high volume shrinking (about 14%) during the polymerization stage of the monomer and due to the comparatively low refractive index of the relative polymerizate. This shrinking originates stress phenomena during the polymerization stage and these are responsible for the release of the article from the mould and the breakage of the article concerned. Other limitations affecting the polymerizate of bis(allylcarbonate) of diethylene glycol stem from its brittleness, which is comparable with that of the polymethylmetacrylate and the comparatively low value of its maximum service temperature.

A polymerizable composition has now been found, which is capable of producing cross-linked and transparent polymers, virtually unaffected by the shortcomings enumerated above.

Accordingly, an object of the present invention is to provide a liquid polymerizable composition, which is capable of producing cross-linked and transparent polymers endowed with outstanding properties, both from the optical and the mechanical standpoint.

Another subject matter of the invention are the polymers obtained from such a liquid composition.

Still another objective of the invention is to produce sheets, lenses or other articles obtained using such polymers as the starting materials.

Other objects of the invention will become apparent from the ensuing description and the practical examples reported hereinafter. The liquid polymerizable composition of the present invention comprises:

(a) from 10% to 90% by weight of an oligomer, or mixture of oligomers, bis(allylcarbonate) of an aliphatic, cyclo aliphatic or aromatic bihydroxyl alcohol having the formula:

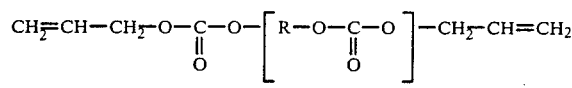

wherein R is the radical of the bihydroxyl alcohol concerned and the value of n, or the average value of n, varies from 2 to 10; the monomeric bis(allylcarbonate) of the bihydroxil alcohol (n=1 in the formula reported immediately above), optionally contained in said oligomer or mixture of oligomers, being less than 50% on a weight basis;

(b) from 0% to 90% by weight of at least one compound selected from:

monomer, or mixture of monomers bis(allylcarbonate) of the bihydroxyl alcohol, or tris(allylcarbonate) of an trihidroxyl aliphatic, cycloaliphatic or aromatic alcohol) having the formula:

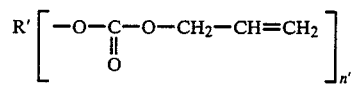

wherein R' is the radical or the bihydroxyl or the trihydroxyl alcohol and n' is 2 or 3; the oligomeric bis(allylcarbonate) or poly(allylcarbonate) of the bihydroxyl or the trihydroxyl alcohol optionally contained in said monomer, or mixture or monomers, being less than 30% by weight;

allyl ester of an aliphatic or aromatic bicarboxyl or tricarboxyl acid, having the formula:

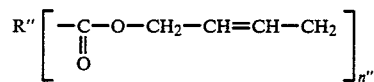

wherein R" is the radical of the bicarboxyl or the tricarboxyl acid and n" is 2 or 3;

triallylcyanurate and triallylisocyanurate;

(c) from 0% to 30% by weight of an acryl or a vinyl monomer; the sum of the compound (b) plus the compound (c) being in any case greater than zero, the liquid composition also containing a catalytically active amount of a substance which generates free radicals.

COMPOUND A

The compound A of the composition of the present invention is an oligomeric, or an essentially oligomeric compound which can be defined by the formula:

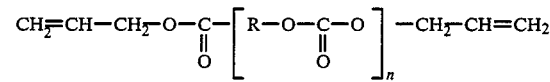

wherein R is the radical of an aliphatic, cycloaliphatic or aromatic bihydroxyl alcohol and n takes values from 2 to 10 and preferably in the order of from 2 to 5. Such a compound can be prepared by reacting diallyl carbonate with a bihydroxyl alcohol, the mutual molar ratio being equal to or less than 4:1, the value of 2:1 being preferred, working with a catalyst of basic nature being present, more particularly an alcoholate of an alkali metal, and generally according to the conditions specified in the U.S. patent application Ser. No. 240,119 filed on Mar. 3, 1981, which is now abandoned.

Nonlimiting examples of bihydroxyl alcohols useful for this purpose are: ethylene glycol, 1,3-propanediol, 1,4-butanediol, 1,6-hexanediol, diethylene glycol and polyethylene glycols in general dipropylene glycol and polypropyleneglycols in general, neopentyl glycol, trimethyl pentadiol, cyclohexanedimethanol, bis(hydroxymethyl)tricyclodecane, 2,7-norbornanediol,$\alpha,\alpha'$-xylenediol, 1,4-bis(hydroxyethoxybenzene) and 2,2-bis[4-(hydroxyethoxy)phenyl]propane.

Under the reaction conditions recalled above an oligomeric reaction product is formed, in which the monomer contents is below 50% by weight.

COMPOUND B

According to an embodiment, the compound (b) of the composition according to the present invention, is a monomeric, or virtually monomeric, compound which can be defined by the formula:

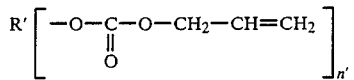

wherein R' is the radical of an aliphatic, cycloaliphatic, aromatic bihydroxyl or trihydroxyl alcohol and n' is 2 or 3. Such a compound can be prepared by reacting diallylcarbonate with a bihydroxyl or a trihydroxyl alcohol, the mutual molar ratio being equal to or higher than 6:1, the value of 12:1 being preferred, working with a catalyst of a basic nature being present, more particularly an alcoholate of an alkali metal and generally in accordance with the prescriptions of the above-cited patent application.

Nonlimiting examples of bihydroxyl alcohols which are suitable for this purpose are those reported in connection with the compound a) as reported above. Nonlimiting examples of trihydroxyl alcohols suitable for this purpose are trimethylolpropane and tris(hydroxyethyl)isocyanurate.

Under the reaction conditions referred to above, a monomeric reaction product is formed, in which the contents of oligomer is less than 30% by weight.

According to an alternative embodiment, the compound b) of the composition according to the present invention is a monomeric compound which can be defined by the formula:

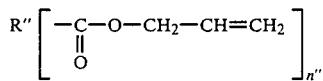

wherein R'' is the radical of a bicarboxyl or a tricarboxyl, aliphatic or aromatic acid, and n'' is 2 or 3. Nonlimiting examples of such a compound b) are: diallylphthalate, diallylsuccinate, diallyladipate, diallylcorendate, diallyldiglycolate, diallylnaphthalenebicarboxylate and triallylmellitate.

According to an alternative embodiment, the compound (b) of the composition of the present invention is triallyl cyanurate or triallyl isocyanurate.

COMPOUND C

The compound (c) of the liquid composition of the present invention is an acrylic or a vinylic monomer. Nonlimiting examples of such a compound (c) are: vinyl acetate, vinyl benzoate, methyl metacrylate, phenyl metacrylate, methyl acrylate, methyl maleate, maleic acid anhydride and vinylidene chloride.

The compounds (a), (b) and (c) of the present invention are generally liquid at room temperature (20° C.-25° C.). In the case of one or more solid compounds, these are soluble in the other components of the composition, so as to originate, in any case, a total composition which is liquid in the environmental usual conditions. The liquid composition of the present invention contains moreover, one or more polymerization initiators which are soluble in the same composition and are capable of generating free radicals in a temperature range of from 30° C. to 120° C. Examples of initiators of the kind are: bicyclohexylperoxydicarbonate, diisopropylperoxydicarbonate, dibenzoylperoxide and tert.butylperbenzoate. The amount of these initiators is generally within the range of from 1% to 6% on a weight basis, the preferred range being from 3% to 5% by weight with respect to the weight of the components (a), (b) and (c).

The liquid composition of the present invention may contain, in addition, one or more conventional additives such as stabilizers, lubricants, dyes, pigments, UV-absorbers, IR-absorbers and the like, in an overall amount anyway not exceeding 1% by weight relative to the weight of the components (a), (b) and (c).

The liquid composition of the present invention is converted into the relevant polymerizate by heating, with the initiator being present, to a temperature in the range of from 30° C. to 120° C. The corresponding polymerization times are in the order of from 3 to 100 hours.

By so doing, it becomes possible to prepare polymerizates of the most varied shapes, such as sheets, lenses and others, by the conventional casting procedures. The liquid composition of the present invention originates, in any case, polymerizates in which the optical and/or mechanical properties are improved, as required for the uses referred to above, such as volume shrinkage, refractive index, impact resistance, distortion temperature and others, while concurrently maintaining unaffected the desirable properties of the polymerizate deriving from bis(allylcarbonate) of diethylene glycol, such as chemical resistance and resistance to abrasion. The polymerizates obtained starting from the compound (a) alone of the composition according to the present invention, generally exhibit unsatisfactory behaviour relative to a few mechanical properties such as elasticity modulus, deflection temperature (HDT) and hardness. Likewise, the polymerizates as obtained starting from the compound (b) alone generally exhibit undesirable physical properties such as brittleness and poor wear resistance. Moreover, a few of these compound (a) and (b) cannot be polymerized, as such, by casting since they are solids in the conditions of use and have high Yellow Indexes, in addition to a strong adhesion to the mould.

It has also been ascertained that the mixtures of monomer and oligomer, as obtained directly from the reaction of diallyl carbonate with a polyhydric alcohol, are not, as such, adapted to produce polymerizates having a desirable number of properties.

By the liquid composition of the present invention polymerizates are obtained which are virtually exempt from the shortcomings discussed in the foregoing and the overall properties of such polymerizates are unexpected on the basis of the optical and physical specifications.

The practical examples which follow have been given by way of example only and are not limitations to the scope of the present invention.

For the examples in question, there have been prepared compositions which contained:

(Compound a): reaction product of diallylcarbonate (DAC) and diethylene glycol (DEG), with a molar ratio DAC:DEG equal to 2:1, the procedure being as described in the abovecited patent application. The compound (a) contains 30% by weight of diethyleneglycol bis(allylcarbonate), the balance being composed of oligocarbonates of diethylene glycol with a bis-allyl end group.

(Compound b): As indicated in the practical examples to follow.

(Compound c): As indicated in the practical examples to follow.

Furthermore, the compositions contain dicyclohexylperoxy dicarbonate (DCPD) in the percentage by weight specified in the individual examples.

The compositions thus obtained, filtered and deaerated with a vacuum pump until all the air bubbles have been discharged, have been cast in moulds consisting of two planar glass sheets, having a gasket of plasticized polyvinyl chloride with a size of 20×20 cm. and a thickness of 3.2 mm. The polymerization step is carried out in an oven with forced ventilation at the temperature of 48° C. for 72 hours.

On completion of this step, the sheets have been withdrawn from the moulds and held for the two subsequent hours at 110° C. so as to dispel possible traces of unreacted catalyst.

The technological properties of the polymerizates thus obtained are tabulated in the tables reported hereinafter.

More particularly, the following properties have been determined:

(a) Optical properties

Refractive Index [$n_D^{20}$], with an Abbe Refractometer (ASTM D-542)

Haze % and Transmittance in the visible spectrum, %: measured by employing the HazegardXL-211 by Gardner (ASTM D-1003)

$$\text{Yellow Index } (YI) = \frac{100. (1.277 \text{ X} - 1.06 \text{ Z})}{Y},$$

as determined with the XL-805 Colorimeter by Gardner (ASTM D-1925).

(b) Physical and Mechanical Properties

Density, determined with a hydrostatic balance at the temperature of 20° C. (ASTM D-792).

Volume shrinkage in polymerization, as calculated after the following equation:

$$\text{Shrinkage, \%} \frac{\text{Polymer density less Monomer density}}{\text{Polymer density}} \cdot 100$$

Rockwell hardness (M), measured with Rockwell Durometer (ASTM D-785)

Tensile Strength and Bending Elasticity Modulus (ASTM D-790)

Wear (abrasion) Resistance, Taber method (ASTM D-1044, modified) carried out with a couple of VS-10F grinding wheels and a load of 500 g on both wheels. The results are expressed in terms of the ratio of the number of passes required to produce a 10% increase for the sample being tested, to the number required for a reference plexiglas sample.

Impact Resistance IZOD, unnotched sample (ASTM D-256, modified)

(c) Thermal properties

Deflection temperature under load (HDT) (°C./18.2 kPa, ASTM D-648)

EXAMPLE I

The compound (b) used here is bis(allylcarbonate) of diethylene glycol, as prepared by reacting diallyl carbonate with diethylene glycol, with a molar ratio of the former to the latter equal to 12:1. Six compositions have been prepared, the first and the sixth being comparison samples, as reported in the table hereunder.

| Composition N° | Compound A % by wt | Compound B % by wt | DCPD % by wt |
|---|---|---|---|
| 1 | — | 95 | 5 |
| 2 | 10 | 83.5 | 4.7 |
| 3 | 20 | 75.5 | 4.5 |
| 4 | 30 | 66 | 4.0 |
| 5 | 40 | 56.2 | 3.8 |
| 6 | 96.5 | — | 3.5 |

EXAMPLE II

The compound (b) used here is bis(allylcarbonate) of bis(hydroxymethyl)tricyclodecane, as prepared by reacting diallyl carbonate with bis(hydroxymethyl)tricyclodecane, the molar ratio of the former to the latter being equal to 12:1. Three compositions have been prepared, the first being a comparison sample, as tabulated in the Table hereunder.

| Composition N° | Compound A % by wt | Compound B % by wt | DCPD % by wt |
|---|---|---|---|
| 1 | — | 96.2 | 3.8 |
| 2 | 20 | 76.4 | 3.6 |
| 3 | 50 | 46.3 | 3.7 |

EXAMPLE III

The compound (b) used here is diallylterephthalate. Four compositions have been prepared, the first being a comparison sample, as tabulated hereunder.

| Composition N° | Compound A % by wt | Compound B % by wt | DCPD % by wt |
|---|---|---|---|
| 1 | — | 95 | 5 |
| 2 | 30 | 66 | 4 |
| 3 | 40 | 55.6 | 4.4 |
| 4 | 50 | 46 | 4 |

EXAMPLE IV

The compound (b) used here is bis(allylcarbonate) of 1,4-butanediol, prepared from diallyl carbonate and 1,4-butanediol, the molar ratio of the former to the latter being 12:1. The compound (c) used here is vinyl acetate. Four compositions have been prepared, the first being a comparison sample, as tabulated hereunder.

| Composition N° | Compound A % by wt | Compound B % by wt | Compound C % by wt | DCPD % by wt |
|---|---|---|---|---|
| 1 | — | 95 | — | 5 |
| 2 | — | 85 | 10 | 5 |
| 3 | 30 | 55.8 | 10 | 4.2 |
| 4 | 40 | 46.2 | 10 | 3.8 |

EXAMPLE V

The compound (B) used here is triallylcyanurate. Two compositions have been prepared, as tabulated hereunder.

| Composition N° | Compound A % by wt | Compound B % by wt | DCPD % by wt |
|---|---|---|---|
| 1 | 76.2 | 20 | 3.8 |
| 2 | 56.5 | 40 | 3.5 |

EXAMPLE VI

The compound (B) used here is tris(allylcarbonate) of tris(hydroxyethyl)isocyanurate, prepared from diallyl carbonate and tris(hydroxyethyl)isocyanurate, the molar ratio of the former to the latter being 12:1. Two compositions have been prepared, as tabulated below.

| Composition N° | Compound A % by wt | Compound B % by wt | DCPC % by wt |
|---|---|---|---|
| 1 | 56 | 40 | 4.0 |
| 2 | 66 | 30 | 4.0 |

EXAMPLE VII

The compound (B) used here is bis(allylcarbonate) of cyclohexanedimethanol, prepared from diallyl carbonate and cyclohexanedimethanol, the molar ratio of the former to the latter being 12:1. Two compositions have been prepared, the first being a comparison sample, as tabulated hereunder.

| Composition N° | Compound A % by wt | Compound B % by wt | DCPD % by wt |
|---|---|---|---|
| 1 | — | 95.4 | 4.6 |
| 2 | 40 | 55.7 | 4.3 |

TABLE I
Technologiocal specifications of the polymerizates of example 1

| PROPERTIES | COMPOSITION N° 1 | 2 | 3 | 4 | 5 | 6 |
|---|---|---|---|---|---|---|
| Density (g/ml) | 1,3110 | 1,3138 | 1,3154 | 1,3175 | 1,3154 | 1,3185 |
| Shrinkage (%) | 12,2 | 11,8 | 11,5 | 11,3 | 11,0 | 9,4 |
| $n_D^{20}$ | 1,5006 | — | 1,4990 | 1,4988 | — | — |
| YI | 1,20 | 0,75 | 0,70 | 0,65 | 0,50 | 0,40 |
| Haze (%) | 0,2 | 0,2 | 0,3 | 0,2 | 0,3 | 0,3 |
| Transmittance in the visible spectrum (%) | 93,2 | 93,2 | 93,3 | 93,4 | 93,5 | 93,3 |
| Rockwell M hardness | 97 | 97 | 93 | 89 | 86 | (*) |
| Flexural modulus (MPa) | 2.400 | 2.350 | 2.300 | 2.000 | 1.750 | 350 |
| Flexural strength (MPa) | 54 | 76 | 68 | 64 | 55 | 14 |
| Impact resistance Izod mod. (kg · cm/cm²) | 3,5 | 6,6 | 9 | 8,3 | 10,7 | 22 |
| Wear resistance (in comparison with Plexiglas) | 15 | 13 | 15 | 15 | 16 | 7,5 |
| HDT (°C.) | 72 | 64 | 55 | 49 | 46 | <30(*) |

(*)cannot be measured

TABLE II
Technological specifications of the polymerizates of example II

| PROPERTIES | COMPOSITION N° 1 | 2 | 3 |
|---|---|---|---|
| Density (g/ml) | 1,2274 | 1,2475 | 1,2794 |
| Shrinkage (%) | 7,1 | 7,6 | 8,2 |
| $n_D^{20}$ | 1,522 | — | — |
| YI | 4,7 | 3,25 | 1,90 |
| Haze (%) | 0,3 | 0,6 | 0,4 |
| Transmittance in the visible spectrum (%) | 91,7 | 92,2 | 93 |
| Rockwell M hardness | 112 | 109 | 94 |
| Flexural modulus (MPa) | 3.300 | 2.900 | 2.200 |
| Flexural strength (MPa) | 96 | 94 | 74 |
| Impact resistance Izod mod. (kg · cm/cm²) | 5,6 | 5 | 11,7 |
| Wear resistance (in comparison with Plexiglas) | 4 | 5 | 9 |
| HDT (°C.) | 92 | 76,2 | 52,5 |

TABLE III
Technological specifications of the polymerizates of example III

| PROPERTIES | COMPOSITION N° 1 | 2 | 3 | 4 |
|---|---|---|---|---|
| Density (g/ml) | 1,2552 | 1,2756 | 1,2853 | 1,2939 |
| Shrinkage (%) | 11 | 10,5 | 10,5 | 10,0 |
| $n_D^{20}$ | 1,573 | 1,550 | 1,542 | 1,535 |
| YI | 5 | 1,5 | 1,15 | 0,95 |
| Haze (%) | 0,5 | 0,5 | 0,5 | 0,5 |
| Transmittance in the visible spectrum (%) | 90,6 | 91,9 | 92,2 | 92,6 |
| Rockwell M hardness | 120 | 116 | 112 | 107 |
| Flexural modulus (MPa) | 2.700 | 2.200 | 2.100 | 1.900 |
| Flexural strength (MPa) | 35 | 50 | — | 62 |
| Impact resistance Izod mod. (kg · cm/cm²) | 1,5 | 2,3 | 4 | 6 |
| Wear resistance (in comparison with Plexiglas) | 2 | — | 6 | 7 |

TABLE III-continued

Technological specifications of the polymerizates of example III

| PROPERTIES | COMPOSITION N° | | | |
|---|---|---|---|---|
| | 1 | 2 | 3 | 4 |
| HDT (°C.) | >160 | >160 | >160 | 111 |

TABLE IV

Technological specifications of the polymerizates of example IV

| PROPERTIES | COMPOSITION N° | | | |
|---|---|---|---|---|
| | 1 | 2 | 3 | 4 |
| Density (g/ml) | 1,270 | 1,2652 | 1,280 | 1,288 |
| Shrinkage (%) | 13,1 | — | — | — |
| $n_D^{20}$ | 1,5008 | 1,497 | 1,494 | 1,490 |
| YI | 1,05 | 1,1 | 0,80 | 0,75 |
| Haze (%) | 0,2 | 0,4 | 0,5 | 0,4 |
| Transmittance in the visible spectrum (%) | 92,8 | 93,2 | 93,1 | 93,2 |
| Rockwell M hardness | 108 | 105 | 97 | 93 |
| Flexural modulus (Mpa) | 1,950 | 2.300 | 2.200 | 2.100 |
| Flexural strength (MPa) | 52 | 46 | 75 | 60 |
| Impact resistance Izod mod. (kg · cm/cm²) | 4,5 | 4,5 | 8,7 | 8 |
| Wear resistance (in comparison with Plexiglas) | 13 | 17 | 22 | 17 |
| HDT (°C.) | >200 | 128,4 | 64,3 | 57 |

TABLE V

Technological specifications of the polymerizates of example V

| PROPERTIES | COMPOSITION N° | |
|---|---|---|
| | 1 | 2 |
| Density (g/ml) | 1,3243 | 1,3273 |
| Shrinkage (%) | 10,9 | 10,0 |
| $n_D^{20}$ | — | — |
| YI | 1,5 | 4,1 |
| Haze (%) | 0,5 | 0,5 |
| Transmittance in the visible spectrum (%) | 92,5 | 91,6 |
| Rockwell M hardness | 101 | 119 |
| Flexural modulus (MPa) | 2.200 | 3.000 |
| Flexural strength (MPa) | 55 | 56 |
| Impact resistance Izod mod. (kg · cm/cm²) | 7,5 | 3,9 |
| Wear resistance (in comparison with Plexiglas) | 19 | 27 |
| HDT (°C.) | 70 | >200 |

TABLE VI

Technological specifications of the polymerizates of example VI

| PROPERTIES | COMPOSITION N° | |
|---|---|---|
| | 1 | 2 |
| Density (g/ml) | 1,360 | 1,352 |
| Shrinkage (%) | 7,0 | 7,8 |
| $n_D^{20}$ | — | — |
| YI | 1,4 | 1,1 |
| Haze (%) | 0,5 | 0,5 |

TABLE VI-continued

Technological specifications of the polymerizates of example VI

| PROPERTIES | COMPOSITION N° | |
|---|---|---|
| | 1 | 2 |
| Transmittance in the visible spectrum (%) | 92,7 | 93 |
| Rockwell M hardness | 104 | 99 |
| Flexural modulus (MPa) | 3.150 | 2.500 |
| Flexural strength (MPa) | 118 | 90 |
| Impact resistance Izod mod. (Kg · cm/cm²) | 15 | 14,6 |
| Wear resistance (in comparison with Plexiglas) | 12 | 15 |
| HDT (°C.) | 68 | 57 |

TABLE VII

Technological specifications of the polymerizates of example VII

| PROPERTIES | COMPOSITION N° | |
|---|---|---|
| | 1 | 2 |
| Density (g/ml) | 1,217 | 1,259 |
| Shrinkage (%) | 9,5 | 9,4 |
| $n_D^{20}$ | — | — |
| YI | 2,8 | 0,55 |
| Haze (%) | 0,15 | 0,3 |
| Transmittance in the visible spectrum (%) | 92,6 | 92,9 |
| Rockwell M hardness | 120 | 104 |
| Flexural modulus (MPa) | 2.500 | 2.100 |
| Flexural strength (MPa) | 53 | 69 |
| Impact resistance Izod mod. (kg.cm/cm²) | 4 | 5,8 |
| Wear resistance (in comparision with Plexiglas) | — | 9 |
| HDT (°C.) | — | 71 |

We claim:

1. A liquid polymerizable composition having outstanding mechanical and optical properties, comprising:

(a) from 10% to 90% by weight of oligomer of the formula

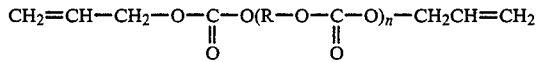

wherein R is the residue of diethylene glycol and n is varied from 2 to 10, said oligomer being obtained by reacting diallylcarbonate with diethylene glycol in a molar ratio of the former to the latter of about 2:1;

(b) a compound selected from the group consisting of bis(allylcarbonate) of diethylene glycol; bis(allylcarbonate) of bis(hydroxymethyl)tricyclodecane; bis(allylcarbonate) of 1,4-butanediol; bis(allylcarbonate) of cyclohexanedimethanol; and tris(allylcarbonate) of tris(hydroxyethyl)isocyanurate said compounds being obtained by reaction of diallylcarbonate with an alcohol selected from the group consisting of diethylene glycol; bis(hydroxymethyl)tricyclohexanedimethanol; or tris(hydroxyethyl)isocyanurate, respectively, in a molar ratio of diallylcarbonate to alcohol of about 12:1; or a member of the group consisting of diallyl terephthalate and triallylcyanurate; and (c) vinyl acetate.

2. A liquid polymerizable composition having outstanding mechanical and optical properties as defined in claim 1 where n is from 2 to 5.

3. A liquid polymerizable composition having outstanding mechanical and optical properties as defined in claim 2 where (b) is the bis(allylcarbonate) of diethylene glycol.

4. A liquid polymerizable composition having outstanding mechanical and optical properties as defined in claim 2 wherein (b) is the bis(allylcarbonate) bis(hydroxymethyl)tricyclodecane.

5. A liquid polymerizable composition having outstanding mechanical and optical properties as defined in claim 2 wherein (b) is the bis(allylcarbonate) of 1,4-butanediol.

6. A liquid polymerizable composition having outstanding mechanical and optical properties as defined in claim 2 wherein (a) is tris(allylcarbonate) of tris(hydroxyethyl)isocyanurate.

7. A liquid polymerizable composition having outstanding mechanical and optical properties which consists of components (a) (b) and (c) as defined in claim 1.

* * * * *